United States Patent
Canova

[19]

[11] Patent Number: 6,118,223
[45] Date of Patent: Sep. 12, 2000

[54] POWER SUPPLY FOR DISCHARGE LAMPS WITH BALANCED RESONANT CIRCUIT

[75] Inventor: Antonio Canova, Arezzo, Italy

[73] Assignee: MagneTek, Inc., Nashville, Tenn.

[21] Appl. No.: 09/010,689

[22] Filed: Jan. 22, 1998

[30] Foreign Application Priority Data

Jan. 27, 1997 [EP] European Pat. Off. ............. 97830018

[51] Int. Cl.[7] .................................................. H05B 37/02
[52] U.S. Cl. ................... 315/244; 315/219; 315/DIG. 2; 315/DIG. 7; 315/276
[58] Field of Search .............................. 315/219, 209 R, 315/DIG. 7, 244, 276, DIG. 2

[56] References Cited

U.S. PATENT DOCUMENTS

| | | | |
|---|---|---|---|
| 2,425,297 | 8/1947 | Atkins et al. | 315/244 |
| 4,066,930 | 1/1978 | Summa | 315/209 R |
| 4,259,614 | 3/1981 | Kohler | 315/244 |
| 4,453,269 | 6/1984 | Skar | 455/129 |
| 4,463,286 | 7/1984 | Justice | 315/244 |
| 4,961,029 | 10/1990 | Shimizu et al. | 315/219 |

FOREIGN PATENT DOCUMENTS

| | | |
|---|---|---|
| 0 113 451 A1 | 12/1983 | European Pat. Off. . |
| 0 326 114 A1 | 1/1989 | European Pat. Off. . |
| 0 390 285 A2 | 3/1990 | European Pat. Off. . |
| 0 610 642 | 1/1993 | European Pat. Off. . |
| 97830018 | 1/1997 | European Pat. Off. . |
| 9000175 | 1/1990 | Netherlands . |

*Primary Examiner*—Michael B Shingleton
*Attorney, Agent, or Firm*—Waddey & Patterson; Mark J. Patterson

[57] ABSTRACT

The invention relates to a lamp arrangement having a resonant circuit arrangement that is balanced and has two LC series circuits each connected between a respective inverter output terminal and a lamp terminal. The two inductive elements being coupled together via a single core.

4 Claims, 2 Drawing Sheets

POWER SUPPLY FOR DISCHARGE LAMPS WITH BALANCED RESONANT CIRCUIT

DESCRIPTION

1. Field of the Invention

The present invention relates to a power supply circuit for discharge lamps of the type comprising a power supply with inverter and a load circuit, into which the lamp is inserted, and which has an LC type resonant circuit in series with the electrodes of the lamp.

2. State of the Art

Circuits for the power supply of discharge lamps of the type mentioned above are known in the art. Examples of such circuits can be found for example in EP-A-0 610 642, EP-A-0 113 451, NL-A-9000175.

Represented in FIG. 1 is a simplified diagram of a circuit for the power supply of a discharge lamp 1.

The circuit has an inverter section, generically indicated by 1, made in a manner known per se to those skilled in the art and not described in greater detail. This typically has two electronic circuit breakers in a half-bridge arrangement which are alternately switched on and off. Upstream of the inverter is arranged a rectifier bridge (not shown) interposed between the power supply network and the inverter.

Between the lamp ζ and the inverter 1 is arranged an LC type oscillating circuit with an inductance L arranged between a first pole 3 of the inverter 1 and a first electrode 5 of the lamp ζ and with a capacitance C between the second pole 7 of the inverter 1 and the second electrode 9 of the lamp ζ. $C_2$ indicates a capacitor in parallel with the lamp ζ.

Upon ignition the inductance L and the capacitance $C_2$ in parallel with the lamp resonate such that an alternating voltage with a high peak value, of the order of 1000 V is developed between the electrodes 5 and 9. Following ignition of the lamp, a potential difference of around 100 V is developed between the electrodes 5 and 9 and resonance occurs between the inductance L and the capacitance C. Under these conditions the voltage at the point $P_1$ is given by the sum of an alternating voltage which oscillates between −200 and +200 V approximately, and a constant voltage of approximately +200 V, whereas at the point P2 the voltage is given by the sum of a voltage oscillating between approximately −30 V and +30 V and a constant voltage of approximately 200 V. The two waveforms of the voltage at the points $P_1$ and $P_2$ are represented diagrammatically in the two graphs on the right of FIG. 1. Specifically, therefore, the point $P_1$ exhibits a potential to earth which varies greatly between two positive and negative values, whereas the potential at the point $P_2$ oscillates slightly about a constant value. This entails a differing leakage of current to earth through the effect of the stray capacitances of the load circuit. Consequently, the current which passes through the lamp is not the same along the whole length of the latter. Since the electrode 5 undergoes a much higher voltage variation than the electrode 9 not all of the current which leaves the electrode 5 reaches the electrode 9, rather some of it leaks away through the effect of the stray capacitances. Consequently this gives a non-constant brightness of the lamp, especially noticeable in the case of a "dimmed" lamp; i.e. when the lamp is operated at a lower luminous intensity than the maximum allowed.

The effect of the leakage capacitances is even more noticeable in the case in which two lamps are placed in series in the same circuit. In this case, to avoid unacceptable variations in brightness along the extent of the two lamps, a particularly complex circuit solution of the type shown in FIG. 2 is currently resorted to. The lamps are indicated by $l_1$ and $l_2$, whilst $L_1$ and $L_2$ indicate two inductances which resonate with the capacitance C. $C_2'$ and $C_2''$ indicate the two capacitances in parallel with the lamps $L_1$ and $L_2$. The power supply inverter represented diagrammatically is again indicated by 1. Essentially, when the load circuit provides for the application of two lamps, the resonant circuit is divided. In order to have the same current in both resonant circuits there is provision for the addition of a compensation transformer indicated generically by 11, whose common-core windings belong to the two resonant circuits associated with the lamps $l_1$ and $l_2$ respectively.

This circuit solution avoids the non-uniformity of brightness of the two lamps in series, but entails a high cost of the circuit, in so far as the two lamps are associated with two independent resonant circuits and furthermore the use of three magnetic components' is required, the third of which (the transformer 11) entails an appreciable increase in the overall cost of the circuit.

SUMMARY OF THE INVENTION

The purpose of the present invention is to produce a circuit for the power supply of discharge lamps which avoids the drawbacks of conventional circuits.

More particularly the purpose of the present invention is to produce a circuit for discharge lamps which makes it possible, with simple and economical structural solutions, to avoid variation in brightness along the lamp, even in the dimmed lamp condition. A further purpose of the present invention is to produce a particularly simple circuit which makes it possible to power two or more lamps in series without additional magnetic elements, with a single oscillating circuit and while eliminating the variation in brightness of the lamps in series.

These and further purposes and advantages which will become clear to those skilled in the art from reading the text which follows are obtained essentially by providing for the LC resonant circuit in series with the lamp to be a balanced resonant circuit. Balanced is understood to mean a circuit in which the values of capacitance and inductance between the lamp and the two terminals of the inverter are substantially equal.

This is obtained in particular for example by arranging an inductance and a capacitance between one pole of the inverter and the first electrode of the lamp, and a second capacitance and a second inductance between the other electrode of the lamp and the second pole of the inverter. When there are two lamps, they can be arranged in series with each other and in series with a single resonant circuit with the same configuration as described above.

In this way an oscillation in voltage between the same maximum and minimum values occurs at the two terminals of the lamp, or at the two terminals of an assemblage of two or more lamps in series. The leakage of current through the effect of the stray capacitances is therefore uniform along the entire lamp or along the lamps in series, thereby obtaining constant brightness under any operating conditions.

In a particularly advantageous configuration of the circuit according to the invention the two inductances are integrated and wound on the same core. In this way the power supply circuit contains a single magnetic component and is particularly economical and compact.

Further advantageous embodiments of the circuit according to the invention are indicated in the attached claims.

BRIEF DESCRIPTION OF THE DRAWINGS

The invention will be better understood by following the description and the appended drawing which shows a practical non-limiting example of the circuit according to the invention. In particular the drawing shows.

DETAILED DESCRIPTION OF AN EMBODIMENT OF THE INVENTION

Figure 1:
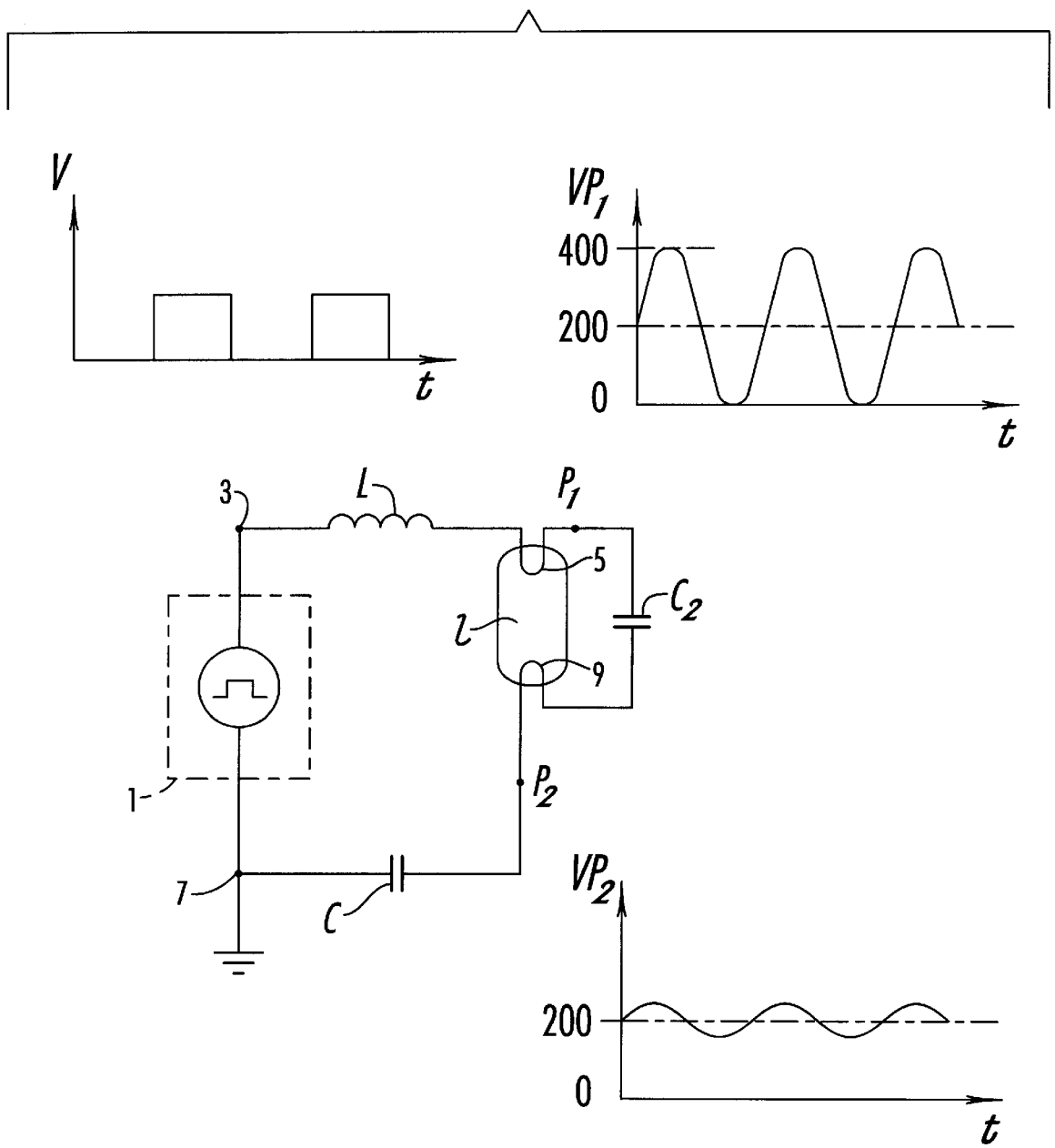
In FIGS. 1 and 2, two circuit solutions respectively with one lamp and with two lamps according to the prior art, as described above.
Figure 2:
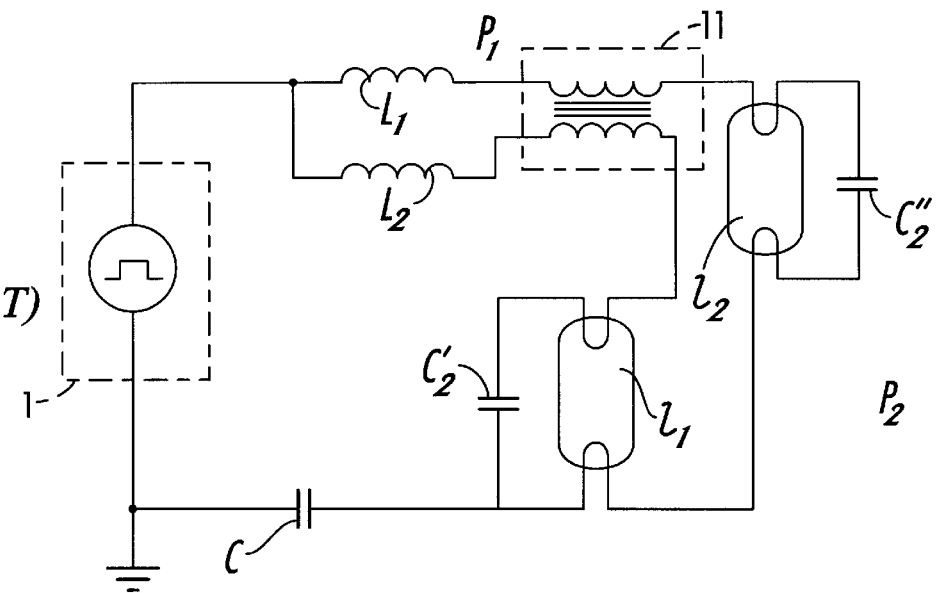
Figure 3:
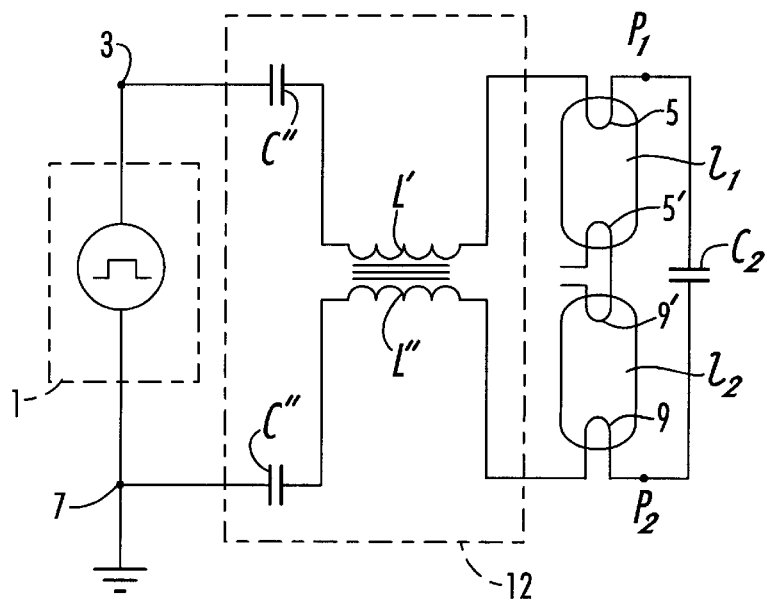
In FIG. 3, a power supply circuit according to the invention with two lamps in series.

In the circuit of FIG. 3 parts which are identical or which correspond to those of the above-described circuits of FIGS. 1 and 2 are indicated with the same reference numerals. More particularly, $l_1$ and $l_2$ indicate two discharge lamps in series, powered by a power supply with inverter 1, of which only a diagrammatic representation is given and the two connections of which are indicated by 3 and 7.

A capacitance $C_2$ is arranged in parallel with the lamps $l_1$ and $l_2$. The electrodes of the lamp $l_1$ are indicated by 5 and 5' and the electrodes of the lamp $l_2$ are indicated by 9 and 9'.

Arranged in series with the assemblage consisting of the two lamps $l_1$ and $l_2$ and of the corresponding capacitor in parallel $C_2$ is a resonant circuit generically indicated by 12, which between the pole 3 of the power supply 1 and the electrode 5 of the lamp $l_1$ comprises a first capacitance C' in series with a first inductance L'. A second capacitance C" in series with a second inductance L" is arranged between the pole 7 and the electrode 9. The two inductances L' and L" are integrated and wound on the same winding core. The two capacitances C' and C" have substantially equal values as do also the two inductances L' and L", so that the resonant circuit 12 is perfectly balanced with respect to the load and consequently an oscillation of voltage between two substantially equal values with a consequent cancelling out of the inhomogeneity of brightness of the lamps on account of the stray capacitances occurs at the points $P_1$ and $P_2$ of the load circuit.

The same configuration can be used in a circuit for powering a single lamp ζ which in this case will be arranged between the electrodes 5 and 9, with the capacitance $C_2$ in parallel therewith and the balanced resonant circuit 12 between the lamp and the power supply with inverter 1.

It is to be understood that the drawing shows merely one example given solely by way of practical demonstration of the invention, it being possible for the invention to vary in its forms and arrangements without however departing from the scope of the concept which underlies the invention. The possible presence of reference numerals in the enclosed claims has the purpose of facilitating the reading of the claims with reference to the description and the drawing, and does not limit the scope of the protection represented by the claims.

I claim:

1. A circuit for the power supply of a discharge lamp, the circuit comprising:

an inverter which provides an alternating voltage across a first pole and a second pole; and a load circuit connected to the inverter, the load circuit including a first and second connection for a discharge lamp and a resonant circuit in series with the first and second connections for a discharge lamp, the load circuit receiving the alternating voltage from the inverter;

wherein the resonant circuit includes:

a first capacitance and a first inductance arranged between the first pole of the inverter and the first connection for a discharge lamp; and a second capacitance and a second inductance arranged between the second pole of the inverter and the second connection for a discharge lamp;

wherein the resonant circuit is balanced; and wherein the first and the second inductances are wound onto one winding core.

2. A ballast assembly comprising:

an inverter with a first pole and a second pole across which an alternating voltage is applied;

a load circuit connected to the inverter and having a first and second connection for a discharge lamp; and a discharge lamp connected between the first and second connections for a discharge lamp;

wherein the load circuit includes a resonant circuit in series with the first and second connections of the load circuit, the load circuit receiving the alternating voltage from the inverter;

wherein the resonant circuit includes:

a first capacitance and a first inductance arranged between the first pole of the inverter and the first connection for a discharge lamp; and a second capacitance and a second inductance arranged between the second pole of the inverter and the second connection for a discharge lamp;

wherein the resonant circuit is balanced; and wherein the first and the second inductances are wound onto the same winding core.

3. The ballast assembly of claim 2 further comprising a second lamp connected in series with the first lamp, both lamps connected in series with the load circuit.

4. The ballast assembly of claim 2 further comprising a capacitor connected in parallel with the discharge lamp.

* * * * *